United States Patent [19]

Blomley et al.

[11] Patent Number: 4,608,462
[45] Date of Patent: Aug. 26, 1986

[54] TELEPHONE INSTRUMENT CIRCUIT

[75] Inventors: Peter F. Blomley, Bishops Stortford; Kenneth A. Arton, Sawbridgeworth; Edward J. Whittaker, Bishops Stortford; Andrew P. Lefevre, Dunmow, all of Great Britain

[73] Assignee: International Standard Electric Corporation, New York, N.Y.

[21] Appl. No.: 662,487

[22] Filed: Oct. 19, 1984

Related U.S. Application Data

[63] Continuation-in-part of Ser. No. 626,004, Jun. 29, 1984, abandoned.

[51] Int. Cl.[4] ............................................. H04M 1/60
[52] U.S. Cl. .................................. 179/81 B; 179/81 R
[58] Field of Search ............... 179/81 B, 100 L, 81 R, 179/84 R

[56] References Cited

U.S. PATENT DOCUMENTS 4,002,854  1/1977  Penrose ............................. 179/81 B

OTHER PUBLICATIONS

Terai et al., "Network Realization for the Small Size Telephone Set", Review of the Electrical Communication Lab., vol. 22, No. 3–4, pp. 227–235, Mar.–Apr. 1974.

Primary Examiner—James L. Dwyer
Attorney, Agent, or Firm—John T. O'Halloran

[57] ABSTRACT

An integrated circuit for a telephone instrument provides the basic (POT) service requirement. The transmit and receive channels of the circuit may be fed via controlled attenuators incorporated in a first ancillary circuit to provide hands-free operation. The circuit also includes a current-limited power supply whereby connection to a second ancillary circuit, including an audio amplifier, may be effected to provide loudspeaker operation.

6 Claims, 3 Drawing Figures

TELEPHONE INSTRUMENT CIRCUIT

CROSS-REFERENCE TO RELATED APPLICATION

This is a continuation-in-part of co-pending application Ser. No. 626,004, filed June 29, 1984, now abandoned.

BACKGROUND OF THE INVENTION

1. Field of the Invention

This invention relates to telephone subscriber instruments and in particular to such instruments wherein the conventional electromechanical arrangements are replaced with electronic circuits.

2. Description of the Prior Art

The conventional electromechanical telephone instrument is gradually being replaced by devices containing electronic circuitry. The electromechanical arrangement, while reliable, is expensive to manufacture and does not lend itself readily to use with a modern electronic exchange. In particular, a number of facilities that can be provided by an electronic exchange cannot be utilized by the conventional instrument.

Electronic instruments require a degree of complexity according to the particular customer requirement. The simplest requirement is for the basic conventional service in what is commonly known as a "plain ordinary telephone (POT)". Other customers require varying degrees of sophistication to take advantage of the range of facilities offered by the electronic exchange.

This range of operational requirements has in the past caused some difficulty in the design of the instrument. Either a single complex device has been used involving a high degree of redundancy for POT applications or different circuits have been specifically designed for each degree of service required. These practices are of course relatively costly. Furthermore, the high current drain introduced by the addition of audio amplifier circuits for hands-free operation may reduce the available voltage to a level below that at which the control circuitry will operate reliably.

A further difficulty with telephone circuits arises from the different requirements of the various circuit portions. Thus the logic and control functions are more suited to CMOS techniques whereas the analog functions are better performed by bipolar circuits. As it is at present impractical to integrate both CMOS and bipolar devices on a single chip it is preferable to divide the various operating functions between a plurality of chips to take full advantage of the features of the two technologies. In present arrangements, however, one chip from such a chip set cannot be used singly, i.e., the entire chip set must be installed even where all the functions thus provided for are not required.

An object of the present invention is to minimize or to overcome these disadvantages.

SUMMARY OF THE INVENTION

According to one aspect of the invention there is provided an integrated circuit for a telephone instrument, said circuit being adapted to provide only a basic telephone requirement and including preamplifiers and amplifiers for the transmit and receive channels respectively, and power supplies for operation of ancillary circuits, wherein the outputs of each said preamplifiers and the inputs of each said amplifiers are coupled to respective external terminals whereby the two channels may be coupled directly or via a first ancillary circuit including controlled attenuators for hands-free operation, and wherein the gains of the preamplifiers are such that their outputs are of similar amplitude whereby in use the signals on the two channels may be compared to provide selection of one or the other channel by the first ancillary circuit.

According to a further aspect of the invention there is provided an integrated circuit chip set for a telephone instrument, the chip set including a primary chip having first and second channels for received and transmitted signals, each said channel including a preamplifier and an amplifier, a first ancillary chip having a tone generator coupled to a loudspeaker amplifier and provided with means whereby the output of the receiver channel amplifier may be coupled selectively to the input of the loudspeaker amplifier, and a second ancillary chip having first and second attenuation channels respectively for the received and transmitted signals and control means whereby the attenuation loss of each said channel is controllable, wherein the primary chip has means whereby the attenuator channels of the second ancillary chip may be coupled between the amplifiers and preamplifiers so as to provide a variable attenuation path for the received and transmitted signals and wherein said control means is adapted to attenuate either the receiver or the transmitter channel so as to prevent acoustic coupling therebetween.

By the term "basic requirement" we mean the replacement of the conventional electromechanical arrangement and thus the provision of an interface between the line and the handset of the instrument and of impedance matching to the line. The additional services provided by the further circuit may include, e.g., a loudspeaking facility, a "hands-free" arrangement, and various forms of repertory dialing.

BRIEF DESCRIPTION OF THE DRAWINGS

An embodiment of the invention will now be described with reference to the accompanying drawings in which.

DETAILED DESCRIPTION

Figure 1:
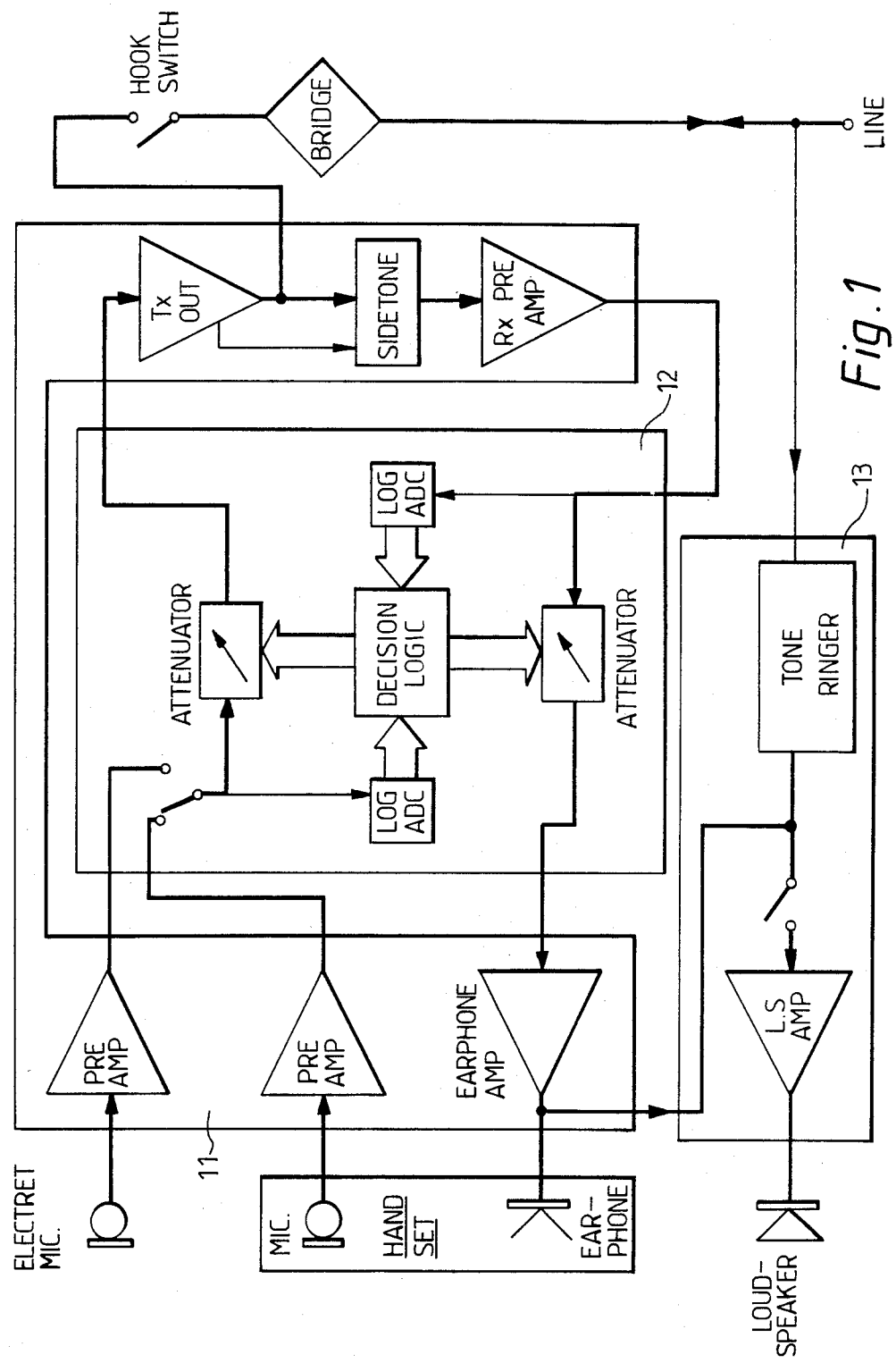
FIG. 1 is a schematic diagram of an electronic circuit arrangement for a telephone instrument.

Referring to the drawings, the circuit arrangement comprises a primary integrated circuit 11 adapted to provide the basic telephone service and ancillary circuits 12 and 13 adapted to provide additional telephone facilities. Typically the circuit 13 incorporates a loudspeaker amplifier and a tone ringer for the circuit 12 incorporates a number of logic and control facilities.

The primary circuit 11 is designed to provide the line interface component for a range of telephones and provides a basic "POT" service with no external active components. The circuit replaces the hybrid coil assembly with an electronic hybrid and drives the telephone line directly.

Figure 2A:
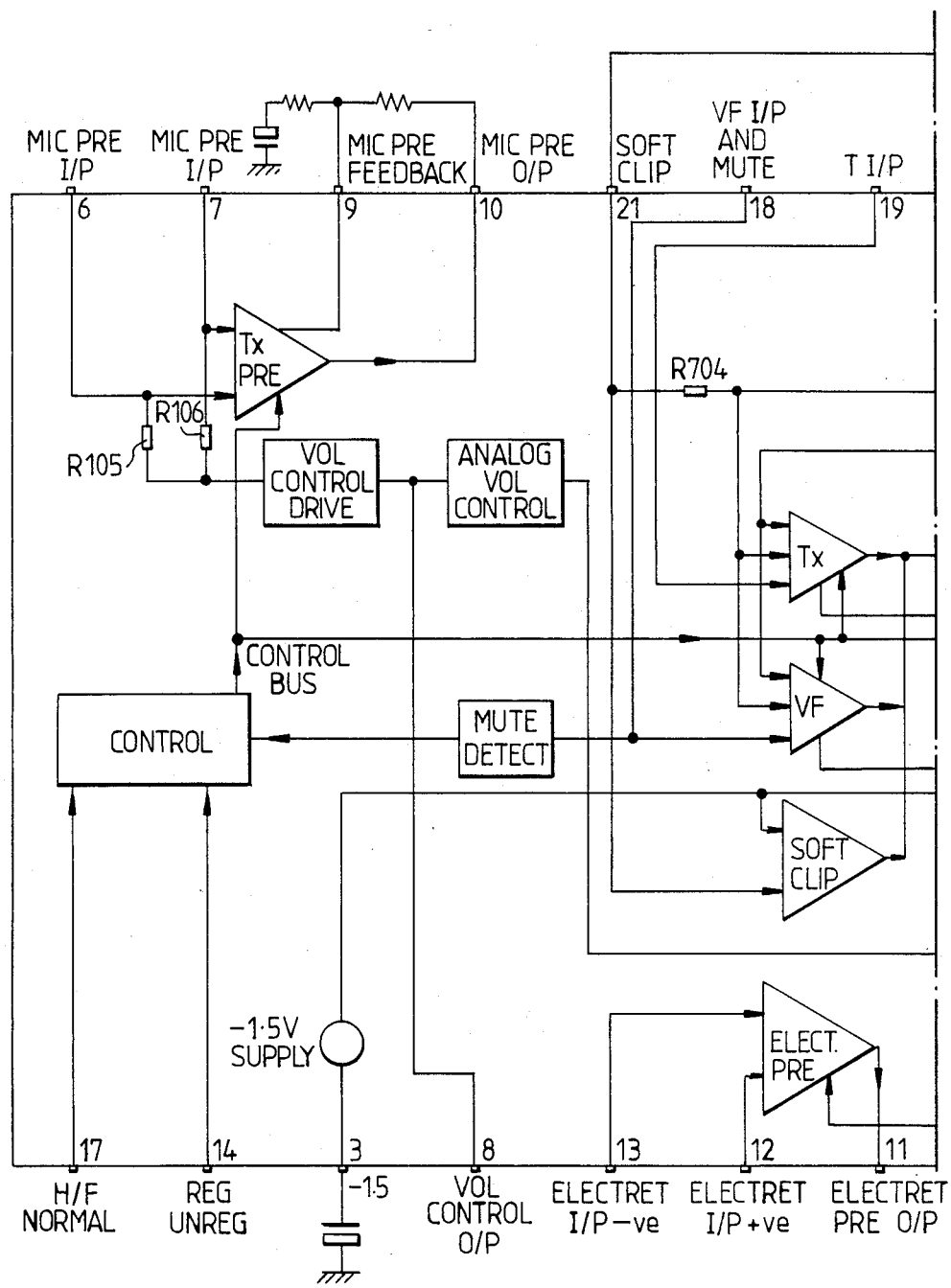
FIGS. 2A–2B is a more detailed schematic diagram of the primary circuit of FIG. 1.
Figure 2B:
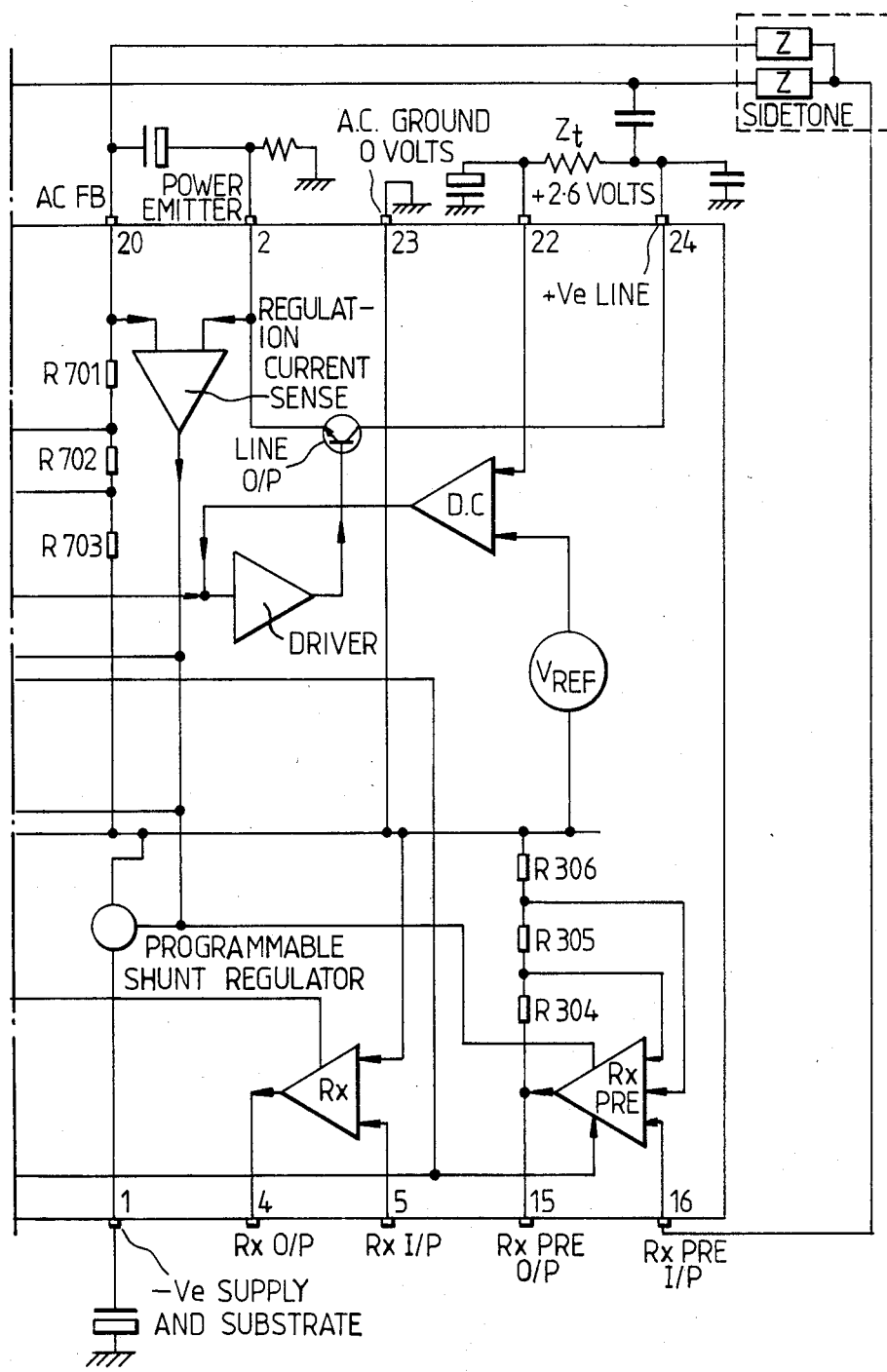

The operation of the primary circuit 11 may be understood by considering the schematic diagram of FIG. 2. There are, in effect, five ports from the IC to the telephone:

1. The mouthpiece microphone is connected to the IC, pins 6 and 7.

2. The earpiece transducer is connected to the IC, pins 4 and 23—which is also the signal common line.
3. A VF generator may be connected to the IC pin 18, VF input and mute, and the two power rails, pin 22 (+2.6 volts) and pin 3 (−1.5 volts).
4. An electret transducer may be connected, via suitable external components, to the IC pins 12 and 13.
5. The telephone line is connected to the IC via suitable protection and polarity guard to pins 24 (positive) and 1 (negative).

The transmit preamplifier is optimised for low noise operation. To minimise the effect of pick-up in the handset cord, the input to the amplifier is balanced. The gain is programmable by selection of components between the output terminal and the feedback terminal of the preamplifier. The gain obtained is given by $$\text{gain} = V_{10} * \text{potential divider ratio of external resistors R1 and R2.}$$

This enables different sensitivity transducers or different handsets to be used. The amplifier is capable of driving 2 volts peak to peak into a 6000 ohm load and the gain may be programmed between 30 dB and 43 dB, making the amplifier suitable for the majority of moving coil transducers, with impedances in the range of 300 to 600 ohms.

Closely associated with the transmit preamplifier is the receiver volume control system. By pulling a balanced current out of the two microphone input pins via resistors R105 and R106, a control current is generated by the VOL CONTROL DRIVE. If pin 8 is connected to ground via a resistor, then a voltage appears at this pin which may be used by the handsfree control IC. In this case the receive output stage defaults to the maximum gain condition. Alternatively, by strapping pin 8 to pin 22, the internal gain control is enabled. This gives the possibility of reducing the gain of the receiver by any amount up to 20 dB. Maximum resistance from the microphone input pins down to ground gives maximum gain.

The main transmitter loop comprises the line O/P transistor, its drive amplifier, the DC amplifier, and either the Tx or VF amplifier—depending on the condition of the Mute Circuit. Also associated with the transmit stage is the Soft Clip amplifier which is operational at high signal levels only. All the stages feeding the Driver amplifier are high output impedance transconductance stages whose outputs are summed together at the Driver input.

Considering first the DC amplifier, this is a combined direct current amplifier and voltage reference and is based on the well known silicon bandgap type of voltage regulator. In this design, the negative temperature coefficient of a transistor base/emitter voltage is compensated by the positive temperature coefficient of the differential base/emitter voltages operated at different emitter current deviations. The amplifier is energized whenever the IC is connected to the telephone line. The impedance Zt connected between pins 22 and 24 feeds power to pin 22. Any AC component is filtered out by the large electrolytic capacitor C1 between pins 22 and 23. The DC potential between pins 22 and 23 is compared to Vref and the loop of amplifiers comprising DC, Driver and Line O/P, keeps the potential at pin 22 constant. Thus at DC and subsonic frequencies the impedance of the transmit O/P stage is very low. However the DC characteristic of the whole IC is also dependent on the programmable shunt regulator whose output is in series with the transmitter. The impedance of the circuit in the audio band is the parallel combination of Zt and the internal impedance of the IC. The potential at pin 2 is a measure of the current in the transmitter O/P stage. The voltage appearing on pin 20 is the AC component of this. At any time either the Tx or the VF amplifier is enabled. Consider the case of the Tx amplifier enabled and the VF disabled. The Tx amplifier comprises two similar long tailed pair transistor amplifiers, either or both of which may be enabled. One pair provides high gain for long line conditions and the other provides low gain. By selecting a combination of both amplifiers, a suitable gain condition may be provided to match the line to which the instrument is connected. Both amplifiers are connected to pin 19, and both amplifier outputs are connected in parallel. The feedback input to one amplifier is connected to the junction of R701, R702, and R704. This gives the low transmit gain condition. The feedback input to the other amplifier is connected to the junction of R702 and R703. This gives the high gain condition. Consider the case when the high gain amplifier is disabled. In the absence of any connection from Soft Clip pin, via R704, the output impedance in the audio band of the Line O/P stage is very high and the impedance presented to the line is dominated by Zt. Pin 21 is however AC coupled by capacitor C2 to the line and R704 provides positive feedback to Tx amplifier. The gain from the Tx I/P to the +ve Line is given by $$\text{gain} = \frac{ZIt(R701 * R704 + (R702 + R703)(R704 + R701))}{(Re * R704 - R701 * ZIt)(R702 + R703)}$$

where ZIt is the parallel combination of Zt and the line impedance, and Re is external resistance between pins 2 and 23.

The output impedance of the transmit stage is given by $$Zo = \frac{Zt * R704 * Re}{Re * R704 - R701 * Zt}$$

With Re set to 12 ohms, the internal resistors R701 to R704 give the Line O/P stage an impedance of −600 ohms in the audio band. Thus if Zt is set to 300 ohms the output impedance of the IC is 600 ohms. Since all the DC power for the circuit and ancillary IC's has to come via Zt, the advantage of this technique is to reduce the voltage drop across Zt, by reducing Zt.

When the low gain Tx stage is deactivated and the high gain stage is enabled, then it can be readily shown that the AC gain is increased by the ratio (R702+R703)/R703. Since R702 and R703 are similar resistors, the gain increase is 6 dB. By varying the ratio of DC current fed by the control circuit to one of the amplifiers relative to the other amplifier, intermediate values of gain may be programmed. The output impedance of the circuit is independent of the gain setting.

The block marked Soft Clip comprises two stages. The first detects whether the amplitude of the line signal exceeds a predetermined value, and the second takes corrective action by reducing the gain of the transmitter. The first is a rectifying detector with an accurately known dead zone. When the AC signal on the line exceeds the limit of the dead zone then an output is generated proportional to the excess signal. This output controls the transconductance of the second part of the circuit—an amplifier whose differential inputs are ground and the junction of R701, R702 and R704. Thus when this amplifier is enabled it attempts to reduce the signal on the line. The Soft Clip becomes operational when the signal on the line exceeds 3 volts peak to peak. The effect of the circuit is to round progressively the peaks of the output waveform, thus preventing any signal greater than 4.5 volts peak to peak from being transmitted to line. The output impedance of the circuit remains constant even during Soft Clip thus preventing any deterioration of sidetone balance, return loss or Zc. This is particularly important where the telephone instrument is to be operated in a hands-free mode.

The transmit signal is separated from the receive signal provided by the sidetone network. The losses introduced by this network mean that the received signal must be amplified before it can be processed by the logic and control circuit 12 to provide the necessary channel switching for hands-free operation.

The Receive Preamplifier block labelled Rx PRE amplifies the signal from the output of the sidetone network. Resistors R304, R305, and R306 define the gain limits of this voltage amplifier. As with the transmit stages, the two limits are 6 dB apart and the gain setting is programmed by the block marked CONTROL. The maximum output capability of this preamplifier is 2 volts peak to peak into a 6000 ohm load.

The purpose of the receive preamp is to amplify the received speech signals to a level similar to that provided by the transmit preamp. Where the telephone is used in the POT mode these signals are fed via the corresponding external terminals to the inputs of the respective transmitter and receiver amplifiers. Where hands-free operation is required, access to the transmit and receive channels is provided via the external terminals.

The Receive Output Stage block labelled Rx amplifiers the signal received either directly from the Rx PRE or via the controlled attenuator of circuit 12 to a sufficient level to drive a sensitive moving coil earpiece transducer whose impedance is typically about 300 ohms. Normally, the gain of this stage is 33 dB but using the Analog Volume Control option, the gain may be reduced by up to 20dB. The peak to peak current output capability is 3 mA, and the peak to peak voltage output is 1.2 volts.

The programmable shunt regulator is in series with the transmit output stage and in parallel with the loudspeaking amplifier in the Tone Ringer IC 13. It is programmed typically between the limits of 1.7 and 4.7 volts according to the line current in the range 8 to 35 mA approximately. The purpose of the regulator is to enable conversion of a telephone including the circuit 11 to loudspeaking operation by interconnection of the circuit 13. At low line currents, e.g., at the end of a long subscriber loop or where two similar instruments are used in parallel, the high current drain of the LS amplifier and tone ringer of the circuit 13 could reduce the available voltage to the circuit 11 to an unacceptably low level. To prevent such an occurrence, the power supply from the circuit 11 to the circuit 13 is shunted by the shunt regulator. If the available line current is less than a predetermined value the shunt regulator comes into operation and progressively reduces the voltage of the supply to the circuit 13 and hence reduces the current drain of that circuit. In consequence the voltage of the supply to the circuit 11 is maintained at a sufficiently high value to ensure reliable operation of the basic telephone functions. Although this means that on very long telephone lines the output of the loudspeaker amplifier is curtailed, it does give the advantage of enabling the DC specification of some telephony specifications to be met. Another advantage is that it enables two similar subsets to operate in parallel without the risk of "current hogging". It also has the effect that current drawn from the +2.6 volt supply, although causing an increase in potential across the transmit stage, causes a reduction in current in the transmit stage, and hence a reduction in potential across the shunt regulator in the range over which it is programmable. This partially compensates for the increased drop across the transmit stage and helps control the DC voltage of the subset under the critical long line condition.

The Electret Preamplifier block marked ELECT PRE is configured as an operational amplifier. This enables frequency shaping to be applied to the electret transducer to match the desired response for the handsfree microphone. The preamplifier is suitable for gains in the range 30dB to 45dB, which may be programmed by suitable choice of external components. The maximum output capability of this preamplifier is 2 volts peak to peak into a 6000 ohm load. The output signal from the electret preamp is of a similar level to that provided by the microphone preamp. This ensures that the circuit 11 can be used for hands-free operation by the interconnection of circuit 12.

The −1.5 volt supply is a simple series regulator from the -ve SUPPLY, the reference used is the +2.6 volt rail. An external electrolytic capacitor is used to provide loop stability and to prevent modulation of this supply. Current, up to a maximum of 1 mA may be drawn from this supply to feed external IC's such as VF tone dialers and microprocessors. Both this supply and the +2.6 volt supply remain fully operational down to less than 8 mA of line current, although excessive current demand from either of these supplies, particularly under these conditions may cause a substantial deterioration of all aspects of IC performance.

The Mute Detect circuit functions as a type of Schmitt trigger. If the potential of pin 18 relative to ground falls below 40 mV then the circuit must revert to the VF dial condition. If the potential rises above 180 mV then the circuit acts as a normal transmission IC. Between these limits hysteresis will determine which state the circuit is in. The Mute Detect circuit instructs the Control circuit whether VF dialing is required. If it is, then the Tx amplifier is disabled and the VF amplifier is enabled and all the preamplifiers are turned off, so as to conserve power, and hence minimize the line voltage of the IC. This also provides the necessary receive mute function. During normal operation the receive preamplifier is always enabled, and a choice of transmit preamplifier is possible via pin 17. This pin is pulled up to +2.6 volts internally and if allowed to float it will disable the electret preamplifier and enable the Tx preamplifier. Pulling this pin down to −1.5 volts changes the powering of the preamplifiers over. The changeover occurs at around ground potential. Pin 14 enables the gain regulation function to be inhibited. Normally, gain regulation occurs between line currents of about 20 to 50 mA, and the regulation is 6 dB in transmit, receive and VF signalling. However, some telephony specifications do not require this compensation, and by strapping this pin to pin 22 (+2.6 v) the regulation is inhibited, and the high gain (long line) condition is selected.

Typically the circuit 12 incorporates decision logic whereby attenuators placed in the receive and transmit paths are controlled to ensure that only one path is active at any one time. This is necessary to prevent unwanted positive feedback when the instrument is used in the hands-free mode. In use, the circuit monitors the input signal from the receive and transmit preamplifiers and attenuates that channel whose input signal is smaller or zero. Preferably, the comparison of the two channels is performed digitally via analog to digital convertors which feed digital signals corresponding to the analog inputs to a decision logic circuit which then performs the comparison. In response to the result of this comparison one or the other of the two channels is enabled. As the circuit 12 is primarily digital in operation, it may advantageously be fabricated using CMOS techniques rather than the bipolar techniques which are preferred for the mainly analog circuits 11 and 13. Power for the circuit 12 may be derived from the circuit 11.

The circuit 13 incorporates an audio amplifier for operating a loudspeaker and may also include a tone ringer. The power from the latter may be derived from the line ringing voltage. Preferably the circuit includes a switch in the path between the tone ringer and the amplifier so that a single amplifier can be used both for tone ringing and loudspeaking operation.

As can be seen from FIG. 2 the outputs of the receiver and transmitter preamplifiers and the inputs of the receiver and transmitter amplifiers are each connected to a corresponding terminal pin. If the circuit 11 is to be used to provide only a basic "POT" service than each preamplifier pin is directly connected to the corresponding amplifier pins. When upgrading of the provided residue is required, the direct connections between the preamplifiers and amplifiers are broken and replaced by the circuit 12 whereby hands-free operation is effected. The circuit 13 is coupled to the shunt regulator output of circuit 11 to effect loudspeaker operation.

Upgrading is thus a simple "plug-in" operation and no additional means are required.

We claim:

1. An integrated circuit for a telephone instrument, said circuit being adapted to provide a basic telephone requirement, comprising:
    a transmit channel preamplifier and amplifier,
    a receive channel preamplifier and amplifier, and
    power supplies for operation of at least one ancillary circuit adapted to supply services other than said basic requirement, wherein one of said power supplies, for a first ancillary circuit incorporating an audio amplifier for loudspeaker operation, has means for disabling said audio amplifier under conditions where available line current falls below a predetermined value.

2. A circuit as claimed in claim 1, further comprising:
    a preamplifier for an electret microphone, and
    means, coupled to said electret microphone preamplifier, whereby the output of said electret microphone amplifier may be selectively coupled to said transmit channel amplifier.

3. A circuit as claimed in claim 1, wherein said circuit is fabricated in bipolar technology.

4. A circuit as claimed in claim 1, wherein the outputs of each of said preamplifiers and the inputs of each of said amplifiers are coupled to respective external terminals whereby said transmit and receive channels may be coupled directly.

5. A circuit as claimed in claim 1, wherein the outputs of each of said preamplifiers and the inputs of each of said amplifiers are coupled to respective external terminals whereby said transmit and receive channels may be coupled via a second ancillary circuit including controlled attenuators for hands-free operation.

6. A circuit as claimed in claim 1, wherein the gains of the preamplifiers are such that their outputs are of similar amplitude whereby in use the signals on said channels may be compared to provide selection of either of said channels by said first ancillary circuit.

* * * * *